US005600313A

United States Patent [19]
Freedman

[11] Patent Number: 5,600,313
[45] Date of Patent: Feb. 4, 1997

[54] COMPUTER KEYBOARD

[76] Inventor: Lorri Freedman, 2667 Loretta St., Yorktown Heights, N.Y. 10598

[21] Appl. No.: 577,112

[22] Filed: Dec. 22, 1995

[51] Int. Cl.$^6$ .................................................. H03K 17/94
[52] U.S. Cl. .............................. 341/22; 341/23; 400/489
[58] Field of Search ....................... 341/22, 23; 345/161, 345/168; 364/709.01, 709.12; 400/472, 479, 486, 489, 715

[56] References Cited

U.S. PATENT DOCUMENTS

| 5,438,331 | 8/1995 | Gilligan | 345/168 |
|---|---|---|---|
| 5,486,846 | 1/1996 | Comer et al. | 345/168 |

FOREIGN PATENT DOCUMENTS

| 94-24865 | 10/1994 | WIPO | 341/22 |
|---|---|---|---|

Primary Examiner—Jeffery Hofsass
Assistant Examiner—Andrew Hill

[57] ABSTRACT

A computer keyboard including a keyboard body that has a top side, a bottom side, and a pair of short peripheral walls with a pair of long peripheral walls therebetween. The top side of the keyboard body has a keyboard mechanism located thereon. A wrist pad is positioned on the top side of the keyboard and is perpendicular one of the long peripheral walls. Included are a plurality of keys that are positioned on the keyboard mechanism and comprised of a space bar, function keys and alphabet keys. A pointing stick is positioned from the space bar and between the alphabet keys of the keyboard mechanism. The pointing stick controls all movement of a cursor on a display screen of a computer. Lastly, a pair of mouse buttons are provided and spaced from the space bar on the keyboard mechanism. The pair of mouse buttons form a right button and a left button that functions in accordance with the pointing stick when the user positions the cursor on an icon.

1 Claim, 3 Drawing Sheets

COMPUTER KEYBOARD

BACKGROUND OF THE INVENTION

1. Field of the Invention

The present invention relates to a computer keyboard and more particularly pertains to providing a plurality of mouse buttons formed integrally with the top side of the keyboard, and further having a built-in wrist pad associated with the top side of the keyboard.

2. Description of the Prior Art

The use of a keyboard is known in the prior art. More specifically, a keyboard heretofore devised and utilized for the purpose of computer operation are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,339,097 to Grant discloses a computer keyboard. U.S. Pat. No. 5,274,766 to Long and Ward discloses a universal keyboard and keyboard/spatial input device controller. U.S. Pat. No. Des. 346,161 to Oh and Lee discloses a keyboard for a computer. U.S. Pat. No. Des. 350,126 to Leung discloses a computer keyboard wit built-in trackball. U.S. Pat. No. Des. 298,535 to Shim discloses a computer keyboard. Lastly, U.S. Pat. No. Des. 281,426 to Kurihara and Mizuno discloses a keyboard for an electronic computer.

While these devices fulfill their respective, particular objectives and requirements, the aforementioned patents do not describe computer keyboard that allows a computer user to control functions within an application through the use of a keyboard that incorporates a variety of programmable function icons along the periphery, and incorporates a plurality of mouse buttons integral with the top side of the keyboard.

In this respect, the computer keyboard according to the present invention substantially departs from the conventional concepts and designs of the prior art, and in doing so provides an apparatus primarily developed for the purpose of providing a plurality of mouse buttons formed integrally with the top side of the keyboard, and further having a built-in wrist pad associated with the top side of the keyboard.

Therefore, it can be appreciated that there exists a continuing need for a new and improved computer keyboard which uses a plurality of mouse buttons formed integrally with the top side of the keyboard, and further having a built-in wrist pad associated with the top side of the keyboard. In this regard, the present invention substantially fulfills this need.

SUMMARY OF THE INVENTION

In view of the foregoing disadvantages inherent in the known types of a keyboard now present in the prior art, the present invention provides an improved computer keyboard. As such, the general purpose of the present invention, which will be described subsequently in greater detail, is to provide a new and improved computer keyboard and method which has all the advantages of the prior art and none of the disadvantages.

To attain this, the present invention essentially comprises a generally rectangular keyboard body that has a top side, a bottom side, and a pair of short peripheral walls with a pair of long peripheral walls. Included is a keyboard mechanism that is located on the top side of the keyboard body. The keyboard mechanism has an inner key area with a peripheral key area therearound. Also, a generally rectangular wrist pad is positioned on the top side of the keyboard below the inner key area and the peripheral key area. The wrist pad is perpendicular one of the long peripheral walls in a lower quadrant of the top side. The wrist pad is formed of a flexible material. The wrist pad has a length equal to a length of the long peripheral walls. Provided are a plurality of keys for depressing by movement of the fingers of a user in a first direction, when positioned within the inner key area of the keyboard mechanism. The plurality of keys form a space bar, function keys and alphabet keys. The plurality of keys are capable of being depressed while a wrist of the user rests on the wrist pad. Additionally, a pointing stick is positioned from the space bar and between the alphabet keys within the inner key area of the keyboard mechanism. The pointing stick is cylindrical and rotatable three and sixty hundred degrees. The pointing stick controls all movement of a cursor on a display screen of a computer by movement of stick with any two fingers of the user. A pair of mouse buttons are positioned along the inner key area of the keyboard mechanism and spaced from the space bar. The pair of mouse buttons form a right button and a left button. The right and left buttons function in accordance with the pointing stick when the user positions the cursor on an icon in a "WINDOWS" application on the display screen of the computer. Lastly, three sets of icon keys are provided. Each set is positioned within the peripheral key area of the keyboard mechanism. The three sets of icon keys form a set of static icon keys, a set of command icon keys and a set of tool bar icon keys. The set of static icon keys is positioned vertically on a left side of the keyboard mechanism. The set of command icon keys are positioned vertically on a right side of the keyboard mechanism. The tool bar icon keys are positioned horizontally above the function keys of the keyboard mechanism. The three sets of icon keys function within an application appearing on the display screen. The three sets of icon keys free up display screen space to allow more screen space for the application when the user is imputing useful data into the computer.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved computer keyboard which has all of the advantages of the prior art a keyboard and none of the disadvantages.

It is another object of the present invention to provide a new and improved computer keyboard which may be easily and efficiently manufactured and marketed.

It is further object of the present invention to provide a new and improved computer keyboard which is of durable and reliable constructions.

An even further object of the present invention is to provide a new and improved computer keyboard which is susceptible of a low cost of manufacture with regard to both materials and labor, and which accordingly is then susceptible of low prices of sale to the consuming public, thereby making such computer keyboard economically available to the buying public.

Still yet another object of the present invention is to provide a new and improved computer keyboard which provides in the apparatuses and methods of the prior art some of the advantages thereof, while simultaneously overcoming some of the disadvantages normally associated therewith.

Even still another object of the present invention is to provide a computer keyboard for providing a plurality of mouse buttons formed integrally with the top side of the keyboard, and further having a built-in wrist pad associated with the top side of the keyboard.

Lastly, it is an object of the present invention to provide a new and improved computer keyboard including a keyboard body that has a top side, a bottom side, and a pair of short peripheral walls with a pair of long peripheral walls therebetween. The top side of keyboard body has a keyboard mechanism located thereon. A wrist pad is positioned on the top side of the keyboard and is perpendicular one of the long peripheral walls in a lower quadrant of the top side. Included are a plurality of keys. The keys are positioned on the keyboard mechanism and comprised of a space bar, function keys and alphabet keys. A pointing stick is positioned from the space bar and between the alphabet keys of the keyboard mechanism. The pointing stick controls all movement of a cursor on a display screen of a computer when a user activates the stick. Lastly, a pair of mouse buttons are provided and spaced from the space bar on the keyboard mechanism. The pair of mouse buttons form a right button and a left button that functions in accordance with the pointing stick when the user positions the cursor on an icon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figures 1, 2:
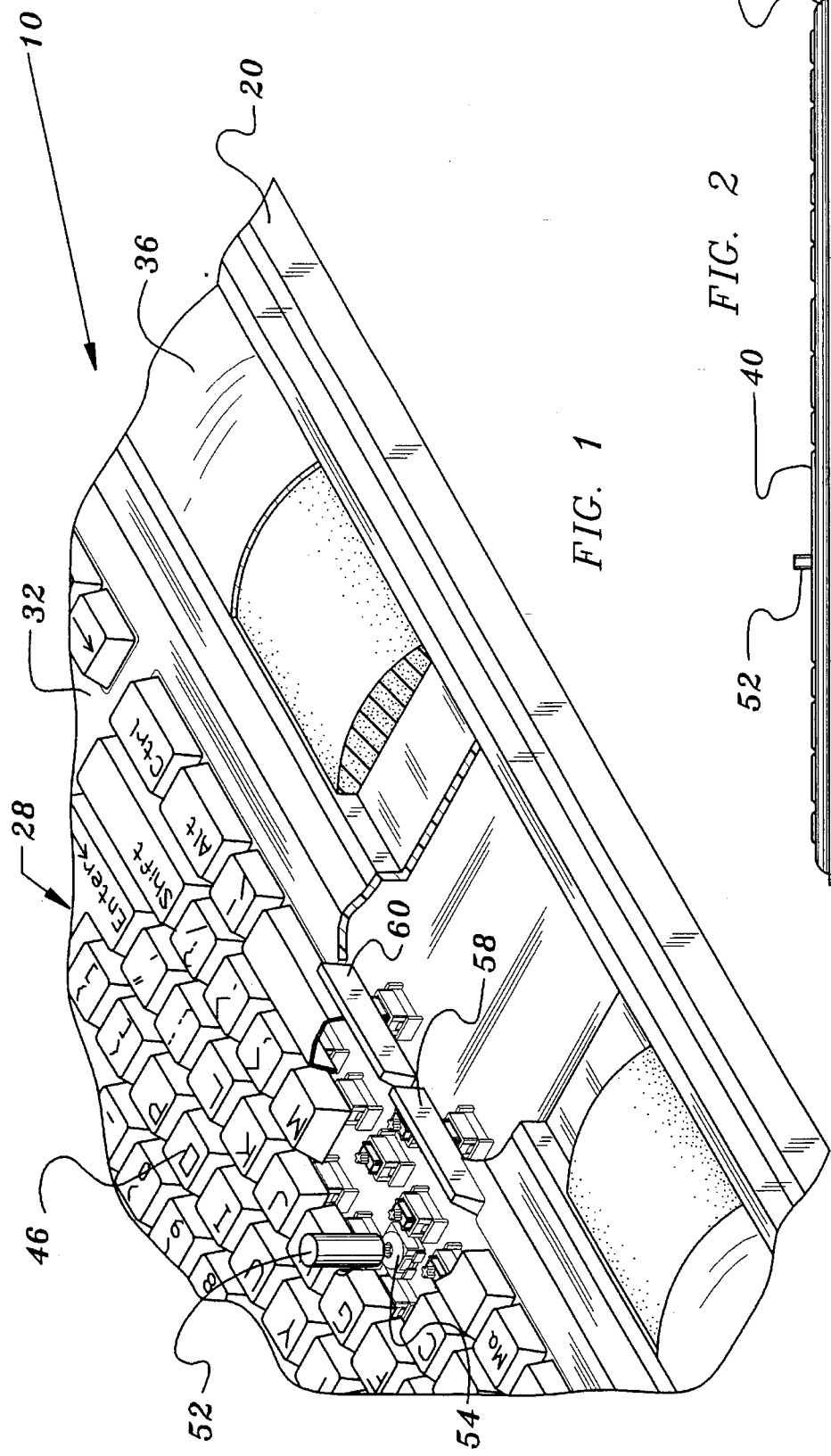
FIG. 1 is a fragmented sectional view of the present invention constructed in accordance with the principles thereof.
FIG. 2 is a front elevational view of the present invention.
Figure 3:
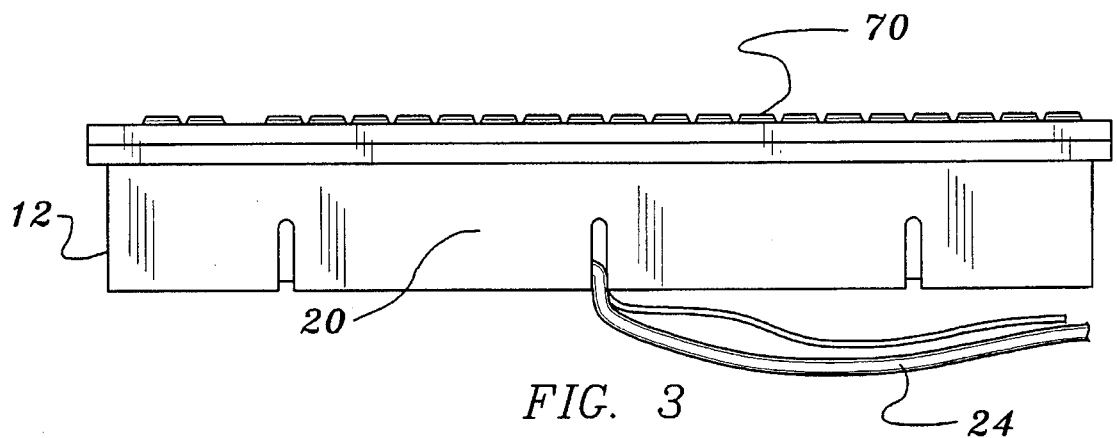
FIG. 3 is a rear elevational view of the present invention.

With reference now to the drawings, and in particular to FIG. 1 thereof, the preferred embodiment of the new and improved computer keyboard embodying the principles and concepts of the present invention and generally designated by the reference numeral 10 will be described.

The present invention, the computer keyboard 10 is comprised of a plurality of components. Such components in their broadest context include a keyboard and a keyboard mechanism. Such components are individually configured and correlated with respect to each other so as to attain the desired objective.

Figure 6:
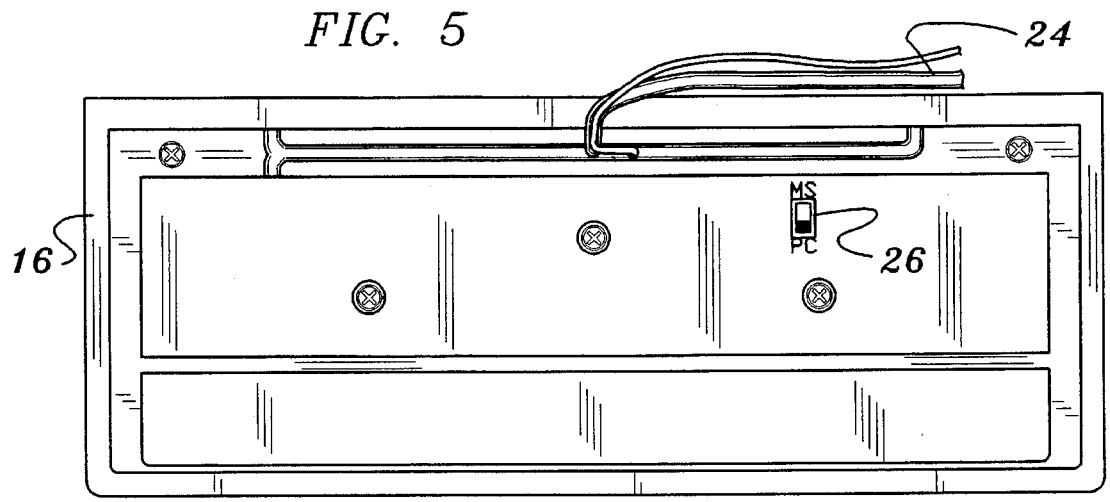
FIG. 6 is a bottom plane view of the present invention.
Figure 7:
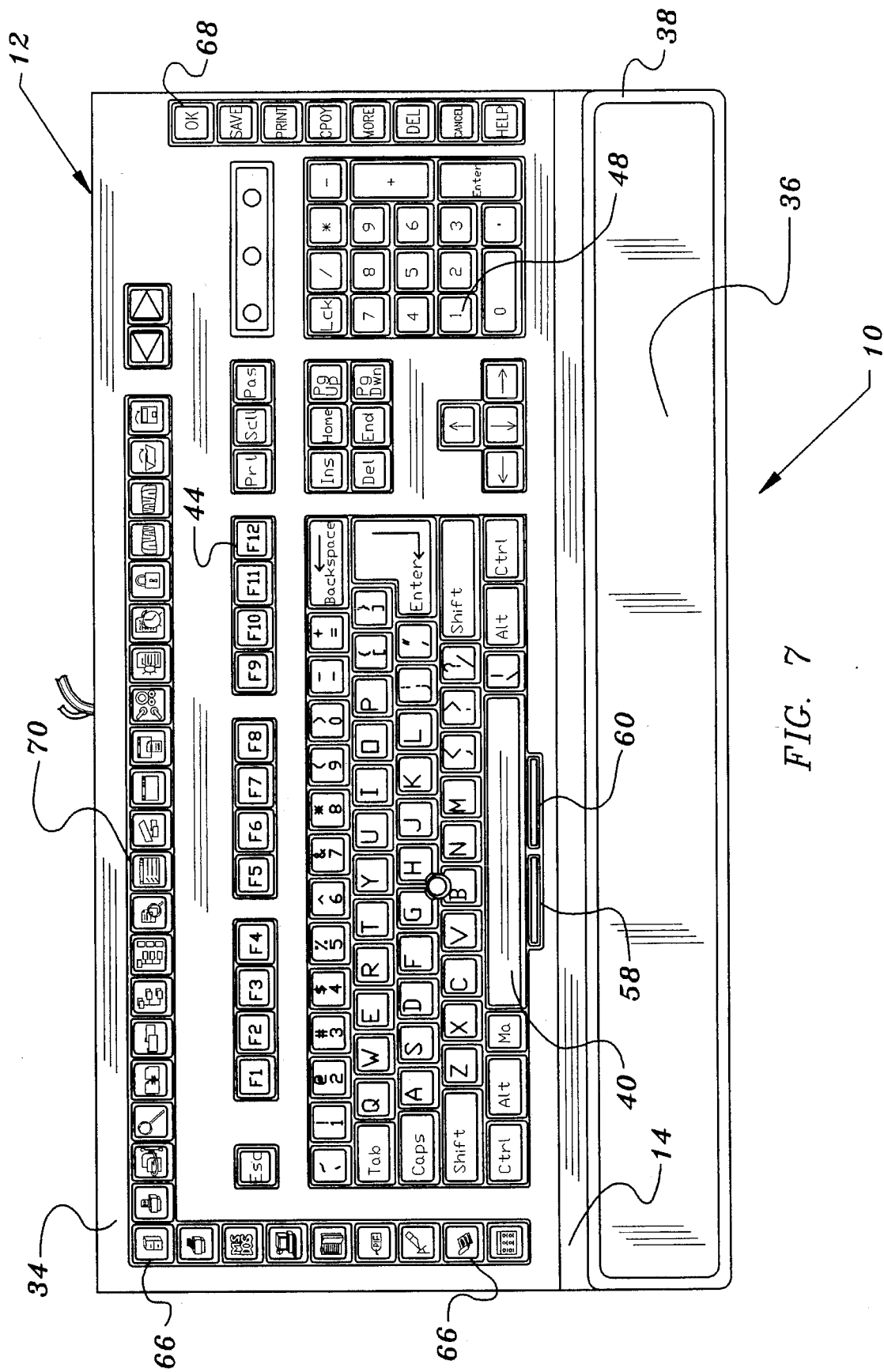
FIG. 7 is a perspective view of the preferred embodiment of the computer keyboard constructed in accordance with the principles of the present invention.

Specifically, the present invention includes a generally rectangular keyboard body 12, as shown in FIG. 7. The keyboard body is formed of a rigid plastic of the type used in commercially available keyboards. The keyboard has a top side 14, a bottom side 16, and a pair of short peripheral walls 18 with a pair of long peripheral walls 20. The bottom side of the keyboard, as shown in FIG. 6, has a pair of wires 24 that extend therefrom for coupling to the CPU of a computer. Also, a switch 26 is included on the bottom side. The switch allows the keyboard to function with the PC or function with multi-stations.

Included is a keyboard mechanism 28 located on the top side 14 of the keyboard body. The keyboard mechanism has an inner key area 32 with a peripheral key area 34 surrounding the inner key area.

As best illustrated in FIG. 7, a generally rectangular wrist pad 36 is positioned on the top side 14 of the keyboard 12, just below the inner key area and the peripheral key area. The wrist pad is perpendicular one of the long peripheral walls 20 in a lower quadrant 38 of the top side. The wrist pad is formed of a flexible material, as shown in FIG. 1. The pad is made from rubber and has a neoprene fabric covering. The wrist pad has a length equal to a length of the long peripheral walls. The wrist pad reduces the onset and severity of the repetitive strain injury known as a carpal tunnel syndrome, as well as other neurological or orthopedic malfunctions.

Additionally, a plurality of keys are included. The keys are for depressing by movement of fingers of a user in a first direction, when positioned within the inner area of the keyboard mechanism. The plurality of keys form a space bar 40, function keys 44 and alphabet keys 46. The plurality of keys may be depressed while the wrist of the user rests on the wrist pad 36. The plurality of keys are arranged in the normal layout of most commercially available keyboards for computers. Further, there are keys bearing numbers 48 arranged in manner familiar to the art.

Figure 4:
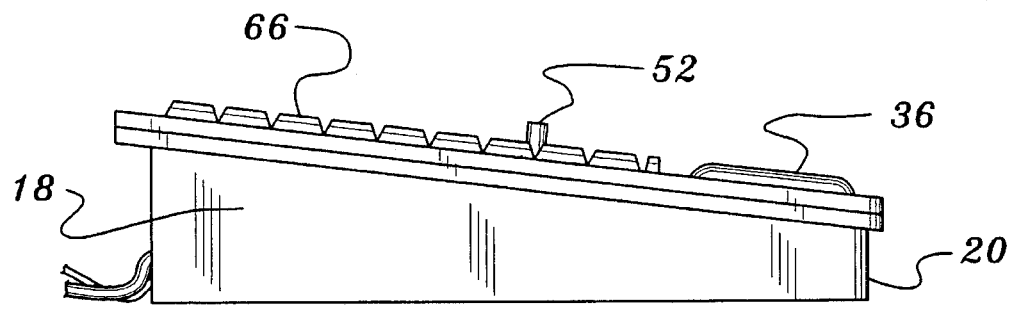
FIG. 4 is a left side view of the present invention of FIG. 1.
Figure 5:
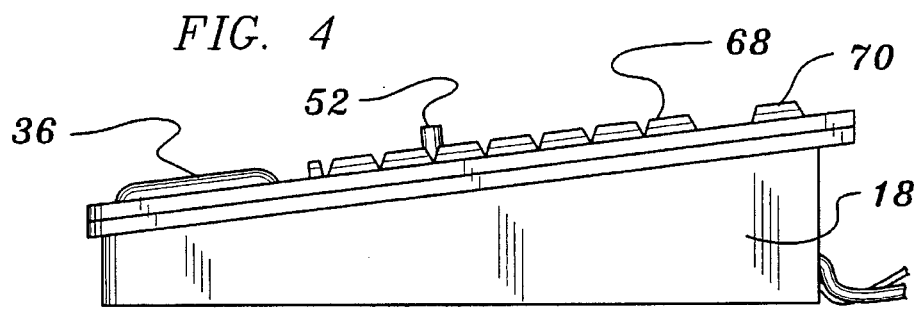
FIG. 5 is a right side view of the present invention constructed in accordance with the principles thereof.

A pointing stick 52 is positioned from the space bar 40 and between the alphabet keys 46 within the inner key area of the keyboard mechanism. Specifically, the pointing stick is positioned between G, H, and B alphabet keys on the keyboard mechanism. FIGS. 4 and 5 show the pointing stick projecting upward above the plurality of keys. The pointing stick is cylindrical and rotatable three hundred and sixty degrees. The pointing stick controls all movement of a cursor on a display screen of a computer. The cursor is moved by movement of stick with any two fingers of the user. The user can control the cursor, by moving the pointing stick, and not removing the hand from over the keyboard mechanism. Pressure on the pointing stick allows it to move the cursor in a direction the pointer stick is rotated. The pointer stick rotates around a universal joint located within the keyboard mechanism.

FIG. 1 shows a pair of mouse buttons 58 and 60. The mouse buttons are positioned along the inner key area of the keyboard mechanism, and spaced from the space bar 40, as shown in FIG. 7. The pair of mouse buttons form a right button 58 and a left button 60. The right and left buttons are capable of functioning in accordance with the pointing stick, when the user positions the cursor on an icon in a "WINDOWS" application on the display screen of the computer. Also, the mouse operates in conjunction with the pull-down menus of the "WINDOWS" application. Addition of the mouse buttons, to the keyboard body, allows continued typing without moving off the keyboard mechanism.

Lastly, three sets of icon keys are included. Each set is positioned within the peripheral key area of the keyboard mechanism, as shown in FIG. 7. The keys are formed of commercially available plastic that is currently being used in the market place for computers. The three sets of icon keys form a set of static icon keys 66, a set of command icon keys 68 and a set of tool bar icon keys 70. The set of static icon keys is positioned vertically on a left side of the keyboard mechanism. The set of command icon keys is positioned vertically on a right side of the keyboard mechanism. The tool bar icon keys are positioned horizontally above the function keys 44 of the keyboard mechanism 28. The three sets of icon keys function within an application appearing on the display screen. The three sets of icon keys are capable of freeing up display screen space to allow more screen space for the application, when the user is imputing useful data into the computer.

The present invention is an improved computer keyboard. The computer keyboard consists of a standard PC keyboard with a wrist pad added, a pointing stick, and mouse buttons, and three sets of icon keys. Specifically, the three sets of icon keys positioned in the peripheral area along the keyboard mechanism allows a user to keep their hands on the keyboard instead of jumping from the keyboard to the mouse for making common application short-cuts. This is especially useful for the professional typists operating data entry applications. By providing a keyboard-concentric input environment making use of these icon sets and the pointing stick, the user will rarely have to pause and loose their flow. A major secondary reason for providing the three sets of icon key, is that they save screen space. The space set is currently being used to display more relevant information pertaining to the application itself. Many applications are overwhelmed with icons, which essentially takes large amounts of screen space from useful data. The three icon sets may be updated programmably, either through the standard keyboard cable or through a secondary cable attached to the parallel port. If a secondary cable is used, the parallel port connection would have a port extended to continue to allow for normal printer through-put.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved computer keyboard for keeping the hands of a user on the keyboard during computer operation comprising in combination:

a generally rectangular keyboard body having a top side, bottom side and a pair of short peripheral walls with a pair of long peripheral walls therebetween, the bottom side of the keyboard having a pair of wires that extend therefrom for coupling to a computer, the bottom side having a switch that allows key board function with the computer;

a keyboard mechanism located on the top side of the keyboard body, the keyboard mechanism having a inner key area with a peripheral key area therearound;

a generally rectangular wrist pad positionable on the top side of the keyboard below the inner key area and the peripheral key area, the wrist pad being perpendicular one of the long peripherals wall in a lower quadrant of the top side, the wrist pad being formed of a flexible material, the wrist pad having a length equal to a length of the peripheral walls;

a plurality of keys for depressing by movement of fingers of a user in a first direction when positionable within the inner key area of the keyboard mechanism, the plurality of keys forming a space bar, function keys and alphabet keys, the plurality of keys capable of being depressed while a wrist of the user rest on the wrist pad;

a pointing stick positionable from the space bar and between the alphabet keys G, H, and B within the inner key area of the keyboard mechanism, the pointing stick being cylindrical and rotatable 360 degrees about a universal joint, the pointing stick being capable of controlling all movement of a cursor on a display screen of a computer by movement thereof with any two fingers of the user;

a pair of mouse buttons being positionable along the inner key area of the keyboard mechanism and spaced from the space bar, the pair of mouse buttons forming a right button and a left button, the right and Left buttons being capable of functioning accordance with the pointing stick when the user positions the cursor on an icon in a Windows application on the display screen of the commuter; and three sets of icon keys with each set being positionable within the peripheral key area of the keyboard mechanism, the three sets of icon keys forming a set of static icon keys, a set of command icon keys and a set of toolbar icon keys, the set of static icon keys being positionable vertically on a left side of keyboard mechanism, the set of command icon keys being positionable vertically on a right side of the keyboard mechanism, the toolbar icon keys being positionable horizontally above the function keys of the keyboard mechanism, the three sets of icon keys being capable of functioning within an application appearing on the display screen, the three sets of icon keys being capable free up display screen space for allowing more screen space for the application when the user inputting useful data into the computer.

* * * * *